(12) United States Patent
Van Doren et al.

(10) Patent No.: US 8,145,847 B2
(45) Date of Patent: Mar. 27, 2012

(54) CACHE COHERENCY PROTOCOL WITH ORDERING POINTS

(75) Inventors: Stephen R. Van Doren, Northborough, MA (US); Gregory Edward Tierney, Chelmsford, MA (US); Simon C. Steely, Jr., Hudson, NH (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1103 days.

(21) Appl. No.: 10/760,640

(22) Filed: Jan. 20, 2004

(65) Prior Publication Data
US 2005/0160231 A1 Jul. 21, 2005

(51) Int. Cl.
*G06F 12/00* (2006.01)

(52) U.S. Cl. ............ 711/141; 711/145; 711/E12.032; 711/E12.033

(58) Field of Classification Search .......... 711/141, 711/145, E12.032, E12.033
See application file for complete search history.

(56) References Cited

U.S. PATENT DOCUMENTS

| | | | |
|---|---|---|---|
| 5,301,298 A | 4/1994 | Kagan | |
| 5,489,791 A | 2/1996 | Arima | |
| 5,535,116 A | 7/1996 | Gupta | |
| 5,706,463 A | 1/1998 | Ebrahim | |
| 5,802,577 A | 9/1998 | Bhat | |
| 5,829,040 A | 10/1998 | Son | |
| 5,875,467 A | 2/1999 | Merchant | |
| 5,875,472 A | 2/1999 | Bauman | |
| 5,893,922 A | 4/1999 | Baylor | |
| 5,945,710 A | 8/1999 | Oda | |
| 5,958,019 A | 9/1999 | Hagersten | |
| 5,987,571 A | 11/1999 | Shibata | |
| 6,049,851 A | 4/2000 | Bryg | |
| 6,055,605 A | 4/2000 | Sharma | |
| 6,085,263 A | 7/2000 | Sharma | |
| 6,108,737 A | 8/2000 | Sharma | |
| 6,128,677 A | 10/2000 | Miller | |
| 6,138,218 A * | 10/2000 | Arimilli et al. | ............... 711/146 |
| 6,245,603 B1 | 6/2001 | Shinohara | |
| 6,272,602 B1 | 8/2001 | Singhal | |
| 6,345,342 B1 | 2/2002 | Arimilli | |
| 6,351,784 B1 | 2/2002 | Neal | |
| 6,457,100 B1 | 9/2002 | Ignatowski | |
| 6,467,012 B1 | 10/2002 | Alvarez | |
| 6,484,240 B1 | 11/2002 | Cypher | |
| 6,490,661 B1 | 12/2002 | Keller | |
| 6,529,990 B1 | 3/2003 | Kruse | |
| 6,615,319 B2 | 9/2003 | Khare | |
| 6,631,401 B1 | 10/2003 | Keller | |

(Continued)

FOREIGN PATENT DOCUMENTS

JP 10-189951 7/1998

(Continued)

OTHER PUBLICATIONS

Rajeev, Joshi, et al., "Checking Cache-Coherence Protocols with TLA+", Kluwer Academic Publishers, 2003, pp. 1.8.

(Continued)

*Primary Examiner* — Mardochee Chery (57) ABSTRACT

A system comprises a first node having an associated cache including data having an associated first cache state. The first cache state is capable of identifying the first node as being an ordering point for serializing requests from other nodes for the data.

16 Claims, 5 Drawing Sheets

U.S. PATENT DOCUMENTS

| | | | |
|---|---|---|---|
| 6,631,448 | B2 | 10/2003 | Weber |
| 6,633,960 | B1 | 10/2003 | Kessler |
| 6,654,858 | B1 | 11/2003 | Asher |
| 6,696,729 | B2 | 2/2004 | Adachi |
| 6,711,653 | B1 | 3/2004 | Quach |
| 6,745,272 | B2 | 6/2004 | Owen |
| 6,751,721 | B1 | 6/2004 | Webb |
| 6,877,056 | B2 | 4/2005 | Cypher |
| 6,883,070 | B2 | 4/2005 | Martin |
| 6,922,756 | B2 | 7/2005 | Hum |
| 6,931,496 | B2 | 8/2005 | Chen |
| 6,993,631 | B2 | 1/2006 | Rowlands |
| 7,032,079 | B1 | 4/2006 | Bauman |
| 7,143,245 | B2 | 11/2006 | Tierney |
| 7,149,852 | B2 | 12/2006 | Van Doren |
| 7,171,521 | B2 | 1/2007 | Rowlands |
| 7,176,097 | B2 | 2/2007 | Hiraizumi |
| 7,222,220 | B2 | 5/2007 | Cypher |
| 7,395,374 | B2 | 7/2008 | Tierney |
| 2001/0034815 | A1 | 10/2001 | Dugan |
| 2002/0009095 | A1 | 1/2002 | Van Doren |
| 2002/0073071 | A1 | 6/2002 | Pong |
| 2002/0129211 | A1 | 9/2002 | Arimilli |
| 2003/0018739 | A1 | 1/2003 | Cypher |
| 2003/0140200 | A1 | 7/2003 | Jamil |
| 2003/0145136 | A1 | 7/2003 | Tierney |
| 2003/0195939 | A1 | 10/2003 | Edirisooriya |
| 2003/0200397 | A1 | 10/2003 | McAllister |
| 2003/0217236 | A1 | 11/2003 | Rowlands |
| 2004/0002992 | A1* | 1/2004 | Cypher et al. ............... 707/102 |
| 2004/0068624 | A1 | 4/2004 | Van Doren |
| 2004/0123047 | A1 | 6/2004 | Hum |
| 2004/0123052 | A1 | 6/2004 | Beers |
| 2004/0181636 | A1 | 9/2004 | Martin |
| 2005/0013294 | A1 | 1/2005 | Cypher |
| 2005/0053057 | A1 | 3/2005 | Deneroff |
| 2005/0060502 | A1 | 3/2005 | Tan |
| 2005/0160238 | A1 | 7/2005 | Steely, Jr. |
| 2005/0251626 | A1* | 11/2005 | Glasco ....................... 711/133 |
| 2005/0251631 | A1 | 11/2005 | Rowlands |

FOREIGN PATENT DOCUMENTS

| | | |
|---|---|---|
| JP | 2000-232075 | 8/2000 |
| JP | 2003-017578 | 1/2003 |

OTHER PUBLICATIONS

Martin, Milo M.K., et al., "Token Coherence: Decoupling Performance and Correctness", ISCA-30, pp. 1-12, Jun. 9-11, 2003.

Acacio, Manuel E., et al., "Owner Prediction for Accelerating Cache-to-Cache Transfer Misses in a cc-NUMA Architecture", IEEE 2002.

Gharachorloo, Kourosh, et al., "Architecture and Design of AlphaServer GS320", Western Research Laboratory, (Date, Unknown).

Gharachorloo, Kourosh, et al., "Memory Consistency and Event Ordering in Scalable Shared-Memory Multiprocessors", Computer Systems Laboratory, pp. 1-14, (Date Unknown).

Notice of Allowance dated Jun. 8, 2006 for U.S. Appl. No. 10/761,044 in the United States.

Final Office Action dated Mar. 21, 2007 for U.S. Appl. No. 10/760,599 in the United States.

Non-Final Office Action dated Oct. 6, 2006 for U.S. Appl. No. 10/760,599 in the United States.

Non-Final Office Action dated Apr. 19, 2006 for U.S. Appl. No. 10/760,599 in the United States.

Final Office Action dated Apr. 18, 2007 for U.S. Appl. No. 10/760,640 in the United States.

Non-Final Office Action dated Oct. 10, 2006 for U.S. Appl. No. 10/760,640 in the United States.

Non-Final Office Action dated Apr. 19, 2006 for U.S. Appl. No. 10/760,640 in the United States.

Final Office Action dated Dec. 4, 2006 for U.S. Appl. No. 10/760,813 in the United States.

Non-Final Office Action dated Jun. 29, 2006 for U.S. Appl. No. 10/760,813 in the United States.

Non-Final Office Action dated May 14, 2009 for U.S. Appl. No. 10/761,048 in the United States.

Notice of Allowance dated Jun. 2, 2009 for U.S. Appl. No. 10/761,047 in the United States.

Final Office Action dated Feb. 4, 2009 for U.S. Appl. No. 10/761,047 in the United States.

Non-Final Office Action dated Aug. 20, 2008 for U.S. Appl. No. 10/761,047 in the United States.

Non-Final Office Action dated Mar. 6, 2008 for U.S. Appl. No. 10/761,047 in the United States.

Non-Final Office Action dated Sep. 20, 2007 for U.S. Appl. No. 10/761,047 in the United States.

Final Office Action dated Jun. 14, 2007 for U.S. Appl. No. 10/761,047 in the United States.

Non-Final Office Action dated Dec. 18, 2006 for U.S. Appl. No. 10/761,047 in the United States.

Non-Final Office Action dated Jun. 15, 2006 for U.S. Appl. No. 10/761,047 in the United States.

Scheurich et al., "The Design of a Lockup-free Cache for High-Performance Multiprocessors", Nov. 14-18, 1988 Supercomputing '88 (vol. 1) Proceedings pp. 352-359.

Laudon et al., "The SGI Orgin: A ccNUMA Highly Scalable Server", 1997 International Conference on Computer Architecture, pp. 241-251.

Final Office Acton dated Apr. 20, 2007 for U.S. Appl. No. 10/760,659 in the United States.

Non-Final Office Acton dated Nov. 17, 2006 for U.S. Appl. No. 10/760,659 in the United States.

Non-Final Office Acton dated May 23, 2006 for U.S. Appl. No. 10/760,659 in the United States.

Final Office Acton dated Mar. 29, 2007 for U.S. Appl. No. 10/761,073 in the United States.

Non-Final Office Acton dated Oct. 6, 2006 for U.S. Appl. No. 10/761,073 in the United States.

Notice of Allowance dated Sep. 27, 2006 for U.S. Appl. No. 10/760,463 in the United States.

Non-Final Office Action dated Mar. 31, 2006 for U.S. Appl. No. 10/760,463 in the United States.

Final Office Action dated Nov. 4, 2005 for U.S. Appl. No. 10/760,463 in the United States.

Non-Final Office Action dated Feb. 25, 2005 for U.S. Appl. No. 10/760,463 in the United States.

Non-Final Office Action dated Sep. 22, 2004 for U.S. Appl. No. 10/760,463 in the United States.

Examiner's Answer dated Jan. 31, 2008 for U.S. Appl. No. 10/760,599 in the United States.

Examiner's Answer dated Aug. 22, 2008 for U.S. Appl. No. 10/760,640 in the United States.

Examiner's Answer dated Jun. 17, 2008 for U.S. Appl. No. 10/760,813 in the United States.

Examiner's Answer dated Jun. 10, 2008 for U.S. Appl. No. 10/760,652 in the United States.

Examiner's Answer dated Feb. 8, 2008 for U.S. Appl. No. 10/760,659 in the United States.

Examiner's Answer dated Mar. 13, 2008 for U.S. Appl. No. 10/761,073 in the United States.

Examiner's Interview Summery dated Jan. 28, 2008 for U.S. Appl. No. 10/760,651 in the United States.

Non-Final Office Action dated Sep. 17, 2008 for U.S. Appl. No. 10/761,048 in the United States.

Final Office Action dated Mar. 13, 2007 for U.S. Appl. No. 10/760,652 in the United States.

Non-Final Office Action dated Jul. 25, 2006 for U.S. Appl. No. 10/760,652 in the United States.

Notice of Allowance dated Feb. 28, 2008 for U.S. Appl. No. 10/760,651 in the United States.

Non-Final Office Action dated Sep. 7, 2007 for U.S. Appl. No. 10/760,651 in the United States.

Non-Final Office Action dated Mar. 28, 2007 for U.S. Appl. No. 10/760,651 in the United States.

Non-Final Office Action dated Oct. 18, 2006 for U.S. Appl. No. 10/760,651 in the United States.

Non-Final Office Action dated May 19, 2006 for U.S. Appl. No. 10/760,651 in the United States.

Non-Final Office Action dated Dec. 19, 2005 for U.S. Appl. No. 10/760,651 in the United States.

Notice of Allowance dated Jun. 29, 2006 for U.S. Appl. No. 10/761,034 in the United States.

Martin, Milo M.K., et al., "Token Coherence: Decoupling Performance and Correctness", ISCH-30, pp. 1-12, Jun. 9-11, 2003.

Rajeev, Joshi et al., "Checking Cache-Coherence Protocols With TLS+", Kluwer Adacemic Publishers, 2003, pp. 1-8.

Handy, "The Cache Memory Book", 1998, Academic Press second edition, pp. 144-155.

Chen et al., "Write Caching in Distributed Filed Systems", Distributed Computing Systems, 1995., Proceedings of the 15th Int'l Con., May 30-Jun. 2, 1995, pp. 457-466.

Archibald et al., "Cache Coherence Portocols: Evaluation Using a Mulitprocessor Simulation Model", Nov. 1986, ACM Transactions on Computer Systems, pp. 273-298.

Gharachorloo, Kourosh et al., "Architecture and Design of AlphaServer GS320", Western Research Laboratory, (Date Unknown).

Gharachorloo, Kourosh et al., "Memory Consistency and Event Ordering in Scalable Shared-Memory Multiprocessors", Computer Systems Laboratory, pp. 1-14(Date Unknown).

Martin et al., "Bandwidth Adaptive Snooping", Proceedings of the Eighth International Symposium on High-Performance Computer Architecture (HPCA'02), 2002 IEEE.

Acacio, Manuel et al., "Owner Prediction for Accelerating Cache-to-Cache Transfer Misses in a cc-NUMA Architecture", IEEE 2002.

\* cited by examiner

CACHE COHERENCY PROTOCOL WITH ORDERING POINTS

RELATED APPLICATIONS

This application is related to the following commonly assigned co-pending patent applications entitled: "SYSTEM AND METHOD FOR RESOLVING TRANSACTIONS IN A CACHE COHERENCY PROTOCOL," application Ser. No. 10/760,813; "SYSTEM AND METHOD TO FACILITATE ORDERING POINT MIGRATION, "application Ser. No. 10/761,048; "SYSTEM AND METHOD TO FACILITATE ORDERING POINT MIGRATION TO MEMORY,"application Ser. No. 10/760,599; "SYSTEM AND METHOD FOR CREATING ORDERING POINTS, "application Ser. No. 10/760,652; "SYSTEM AND METHOD FOR CONFLICT RESPONSES IN A CACHE COHERENCY PROTOCOL WITH ORDERING POINT MIGRATION, "application Ser. No. 10/760,651; "SYSTEM AND METHOD FOR READ MIGRATORY OPTIMIZATION IN A CACHE COHERENCY PROTOCOL, "application Ser. No. 10/761,044; "SYSTEM AND METHOD FOR BLOCKING DATA RESPONSES, "application Ser. No. 10/761,034; "SYSTEM AND METHOD FOR NON-MIGRATORY REQUESTS IN A CACHE COHERENCY PROTOCOL, "application Ser. No. 10/760,659; "SYSTEM AND METHOD FOR CONFLICT RESPONSES IN A CACHE COHERENCY PROTOCOL WITH ORDERING POINT MIGRATION,"application Ser. No. 10/761,073; "SYSTEM AND METHOD FOR CONFLICT RESPONSES IN A CACHE COHERENCY PROTOCOL,"application Ser. No. 10/761,047;"SYSTEM AND METHOD FOR RESPONSES BETWEEN DIFFERENT CACHE COHERENCY PROTOCOLS" application Ser. No. 10/760,436, all of which are filed contemporaneously herewith on Jan. 20, 2004, and are incorporated herein by reference.

BACKGROUND

Multi-processor systems employ two or more computer processors that can communicate with each other, such as over a bus or a general interconnect network. In such systems, each processor may have its own memory cache (or cache store) that is separate from the main system memory that the individual processors can access. Cache memory connected to each processor of the computer system can often enable fast access to data. Caches are useful because they tend to reduce latency associated with accessing data on cache hits, and they work to reduce the number of requests to system memory. In particular, a write-back cache enables a processor to write changes to data in the cache without simultaneously updating the contents of memory. Modified data can be written back to memory at a later time.

Coherency protocols have been developed to ensure that whenever a processor reads a memory location, the processor receives the correct or true data. Additionally, coherency protocols help ensure that the system state remains deterministic by providing rules to enable only one processor to modify any part of the data at any one time. If proper coherency protocols are not implemented, however, inconsistent copies of data can be generated.

There are two main types of cache coherency protocols, namely, a directory-based coherency protocol and a broadcast-based coherency protocol. A directory-based coherency protocol associates tags with each memory line. The tags can contain state information that indicates the ownership or usage of the memory line. The state information provides a means to track how a memory line is shared. Examples of the usage information can be whether the memory line is cached exclusively in a particular processor's cache, whether the memory line is shared by a number of processors, or whether the memory line is currently cached by any processor.

A broadcast-based coherency protocol employs no tags. Instead, in a broadcast-based coherency protocol, each of the caches monitors (or snoops) requests to the system. The other caches respond by indicating whether a copy of the requested data is stored in the respective caches. Thus, correct ownership and usage of the data are determined by the collective responses to the snoops.

SUMMARY

One embodiment of the present invention may comprise a system that includes a first node having an associated cache including data having an associated first cache state. The first cache state is capable of identifying the first node as being an ordering point for serializing requests from other nodes for the data.

Another embodiment of the present invention may comprise a multi-processor network that includes a plurality of processor nodes. Each processor node has at least one associated cache. The plurality of processor nodes employs a coherency protocol. The coherency protocol employs ordering points for serializing requests for data associated with the at least one associated cache of the plurality of processor nodes. The ordering point for the data is capable of being associated with the at least one associated cache of one of the processor nodes.

Another embodiment of the present invention may comprise a method that includes employing a first cache state to identify a first node of a system as being an ordering point for a block of data. The method also includes providing a data response from the first node to a request from a second node of the system for the block of data.

Another embodiment of the present invention may comprise a coherency protocol operative to assign a cache state to a cache line of one node of a plurality of nodes of a system. The cache state defines the one node as an ordering point in the system for data in the cache line of the one node.

DETAILED DESCRIPTION

This disclosure relates generally to systems and methods for a cache coherency protocol in a system including a plurality of processor nodes. The cache coherency protocol supports cache ordering points for data blocks cached at the processor nodes of the system. A state of the data block cached at a processor node defines the processor node as a point for serializing requests from other processor nodes for the data block. Thus, when a source processor node issues a request for a data block, a target processor node that is a cache ordering point for the data can provide a data response. This can be referred to as a "two-hop" transaction, the first hop being the request issued to the target processor and the second hop being the target processor providing the data response to the source processor. This can provide improved latency over systems that require three hops to complete a transaction.

The cache coherency protocol also supports migratory data. Migratory data can be defined as a class of data blocks that are shared by a plurality of processors and are characterized by a per processor reference pattern which includes a read and a write in close temporal proximity in the instruction stream of the processor. In general, migratory data blocks are expected to be shared in a manner in which each processor is provided with an opportunity to complete its read-write sequence before any other processors initiate their read-write sequence. The cache coherency protocol supports migratory data via the transfer of cache ordering points for the data between the processors.

Migratory data support is a system function implemented through the cache coherency protocol described herein. When a processor begins a migratory data sequence, for example, it encounters a read reference in its instruction stream that provides no indication that the read reference is operative on a migratory data line. Thus, when a read request is issued to the system by the processor, it is issued as a simple read request (XREAD). The cache coherency protocol described herein employs a predictive function to determine whether the read request is addressing a migratory data line. This predictive function can be a cache state decode mechanism responsive to the states of all processors that are targets of snoops associated with the XREAD request. The predictive function implemented in the cache coherency protocol described herein covers a comprehensive set of coherence timing and conflict cases that can arise during migratory data flows. Once migratory data is detected, the XREAD request is completed implementing measures to ensure that the XREAD is completed correctly.

If a read snoop finds the requested line cached in a modified state in another cache, the data is returned to the requestor in a dirty state. Thus, in effect, when migration takes place, the migratory read command acts like a write command, moving the cache ordering point to the requesting node. The cache coherency protocol also employs conflict states that are assigned to a miss address file (MAF) entry for an outstanding broadcast snoop request. The conflict states are used to determine how to handle conflicts between requests for the same cache line at essentially the same time that are initiated by more than one processor and recorded in MAF entries at those processors.

Figure 1:
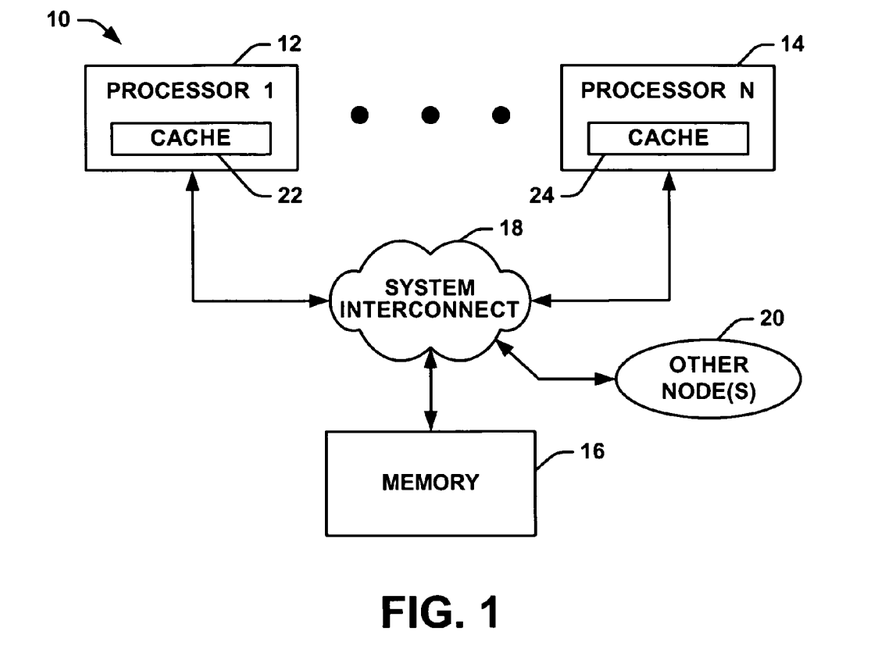
FIG. 1 depicts an example of a multi-processor system.

FIG. 1 depicts an example of a system 10 implementing a cache coherency protocol. The system 10 illustrates a multi-processor environment that includes a plurality of processors 12 and 14 (indicated at PROCESSOR 1 through PROCESSOR N, where N is a positive integer (N>1)). The system 10 also includes memory 16 that provides a shared address space. For example, the memory 16 can include one or more memory storage devices (e.g., dynamic random access memory (DRAM)).

The processors 12 and 14 and memory 16 define nodes in the system 10 that can communicate with each other via requests and corresponding responses through a system interconnect 18. For example, the system interconnect 18 can be implemented as a switch fabric or a hierarchical switch. Also associated with the system 10 can be one or more other nodes, indicated schematically at 20. The other nodes 20 can correspond to one or more other multi-processor systems connected to the system interconnect 18, such as through an appropriate interconnect interface (not shown).

Each of the processors 12 and 14 includes at least one corresponding cache 22 and 24. For purposes of brevity, each of the respective caches 22 and 24 is depicted as a unitary memory device, although the caches may include a plurality of memory devices or different cache levels. The system 10 employs the caches 22 and 24 and the memory 16 to store blocks of data, referred to herein as "memory blocks." A memory block can occupy part of a memory line, an entire memory line or span across multiple lines. For purposes of simplicity of explanation, however, it will be assumed that a memory block occupies a single "memory line" in memory or a "cache line" in a cache. Additionally, a given memory block can be stored in a cache line of one or more caches as well as in a memory line of the memory 16.

Each of the caches 22 and 24 includes a plurality of cache lines. Each cache line has an associated tag address that identifies corresponding data stored in the line. Each cache line can also include information identifying the state of the data stored in the respective cache. A given memory block can be stored in a cache line of one or more of the caches 22 and 24 as well as in a memory line of the memory 16, depending on the state of the line. Whether a cache line contains a coherent copy of the data also depends on the state of the cache line. Certain states employed by the coherency protocol can define a given cache line as an ordering point for the system 10 employing a broadcast-based protocol. An ordering point characterizes a serialization of requests to the same memory line (or memory block) that is understood and followed by the system 10.

The system 10 implements the cache coherency protocol to manage the sharing of memory blocks to help ensure coherence of data. The coherency protocol establishes rules for transitioning between states, such as if data is read from or written to memory 16 or one of the caches 22 and 24.

The coherency protocol can be implemented as a hybrid cache coherency protocol, such as a broadcast source snoop protocol (SSP) implemented in conjunction with a forward progress (e.g., directory-based or null-directory) protocol (FPP). A forward progress protocol can be considered deterministic because FPP transactions (e.g., FPP request transactions) are typically resolved successfully. A source snoop protocol can be considered non-deterministic because, while most SSP transactions (e.g., SSP broadcast snoop request transactions) are resolved successfully, situations may be encountered where an SSP transaction cannot be deterministically resolved. Thus, the SSP protocol may be considered an incomplete protocol since there are circumstances that require the use of a correctness protocol (e.g. a forward progress protocol) in which all transactions can be deterministically resolved. Characteristic of the hybrid cache coherency protocol, transactions, such as requests for data, are initially transmitted using an SSP broadcast snoop request. If the SSP broadcast snoop request cannot resolve the transaction deterministically, such as where there is a conflict between multiple processors attempting to read and/or write the same cache line, the hybrid cache coherency protocol can transition to an FPP mode to deterministically resolve the transaction. Other forward progress techniques could also be utilized.

As used herein, a node that issues a request, such as a read or write request, defines a source node. Other nodes within the system 10 are potential targets of the request. Additionally, each memory block in the system 10 can be assigned a home node that maintains necessary global information and a data value for that memory block. When a source node issues a source broadcast snoop request for data, an entry associated with the request is allocated in a miss address file (MAF). The MAF maintains information associated with, for example, the address of the data being requested, the type of request, and response information received from other nodes in response to the request. The MAF entry for the request is maintained until the request associated with the MAF is complete.

For example, when a source node, such as the processor 12, requires a copy of a given memory block, the source node typically first requests the memory block from its local, private cache by comparing selected cache tags to the address associated with the memory block. If the data is found locally, the memory access is resolved without communication via the system interconnect 18. When the requested memory block is not found locally, the source node 12 can request the memory block from the system 10, including the memory 16. In addition to the request identifying an address associated with the requested memory block, the request usually identifies the type of request or command being issued by the requester. Whether the other nodes 14 and the memory 16 will return a response depends upon the type of request, as well as the state of the identified memory block if contained in the responding nodes. The cache coherency protocol implemented by the system 10 defines the available states and possible state transitions.

A set of cache states that can be included in the cache coherency protocol described herein is depicted below in Table 1. Each cache line of the respective caches 22 and 24 of the processors 12 and 14 may be associated or tagged with one of the cache states in table 1. Since there are eight possible states, the state information can be encoded by a three-bit data word, for example.

TABLE 1

| STATE | DESCRIPTION |
|---|---|
| I | Invalid - The cache line does not exist. |
| S | Shared - The cache line is valid and unmodified by caching processor. Other processors may have valid copies, and the caching processor cannot respond to snoops by returning data. |
| E | Exclusive - The cache line is valid and unmodified by caching processor. The caching processor has the only cached copy in the system and may respond to snoops by returning data. |
| F | First (among equals) - The cache line is valid and unmodified by caching processor. Other processors may have valid copies, and caching processor may respond to snoops by returning data. |
| D | Dirty - The cache line is valid and more up-to-date than memory. The cache line has not been modified by the caching processor, and the caching processor has the only cached copy in the system. The caching processor responds to snoops by returning data and writes data back to memory upon displacement. The dirty state permits a modified block to be transferred between caches without updating memory. |
| M | Modified - The cache line is valid and has been modified by the caching processor. The caching processor has the only cached copy in the system, and the caching processor responds to snoops by returning data and writes data back to memory upon displacement. |
| O | Owned - The cache line is valid and more up-to-date than memory. The caching processor cannot modify the cache line. Other processors may have valid copies, and the caching processor responds to snoops by returning data and writes data back to memory upon displacement. |
| T | Transition - The cache line is in transition. The cache line may be transitioning from O, M, E, F or D to I, or the line may be transitioning from I to any one of the valid states. |

As mentioned above, the state of a cache line can be utilized to define a cache ordering point in the system 10. In particular, for a protocol implementing the states set forth in Table 1, a processor including a cache line having one of the states M, O, E, F or D may be referred to as an owner processor or node and can serve as a cache ordering point for the data contained in the cache line for transactions in the broadcast-based protocol. An owner processor (e.g., processor 12 or 14) that serves as the cache ordering point is capable of responding with data to snoops for the data. For example, processor 14 may be an owner processor for particular data and thus can provide a copy of the data to another cache 12 in response to a read request from cache 12 in a two-hop transaction. This can improve latency of the transaction over that which would be experienced in a three-hop transaction, e.g., where the request is sourced to a home processor, which directs the request to an owner processor to obtain the data. The type of data returned by an owner processor depends on the state of the data stored in the processor's cache. The response may also vary based on the type of request as well as whether a conflict exists. The memory 16 seeks to return a copy of the data stored in the memory. The memory copy of the data is not always a coherent copy and may be stale (e.g., when there is a modified copy of the data cached by another processor).

The cache coherency protocol described herein also provides for ordering point migration in which a cache ordering point is transferred from cache of a target processor to cache of a source processor in response to a source broadcast read request depending on a migratory predictor, such as the cache state of a target processor for a line of data. For example, a target node (e.g., processor 14) including an M-state cache line can, in response to a source broadcast read request, provide an ownership data response to a source node (e.g., processor 12), and the source node cache line transitions to the D-state. Upon completion of the ordering point transfer, the target processor 14 cache line transitions to the I-state. The ordering point is thus transferred (i.e., the ordering point migrates) from the target processor 14 to the source processor 12.

To mitigate the vulnerability of the ordering point during migration, the cache line of the target processor 14 can transition to the T-state while the ordering point migration is pending. Additionally, the source processor 12 can provide a message that acknowledges when the ordering point has successfully migrated (e.g., a migration acknowledgement or "MACK" message). The cache line of the target processor 14 can further transition from the T-state to the I-state in response to receiving the MACK message from the source processor 12. The target processor 14 can respond to the MACK message by providing a further acknowledgement message back to the source processor 12 (e.g., a MACK acknowledgement or MACK-ACK message). The source broadcast read request by the source processor 12 that initiated the migration sequence can be considered completed in response to receiving the MACK-ACK message from the target processor 14.

The processors 12 and 14 of the system 10 can obtain copies of desired data by issuing data requests in either the SSP or FPP portion of the cache coherency protocol implemented in the system. A list of example data requests that can be included in the SSP portion of the cache coherency protocol described herein, and thus issued through a source broadcast request by a processor (e.g., processors 12 and 14), is depicted below in Table 2.

TABLE 2

| Request Type | Request | Request Description |
|---|---|---|
| Reads | XREADN | Broadcast read line code: Non-migratory read request. |
| | XREAD | Broadcast read line data: Simple read request. |
| | XREADC | Broadcast read current (non-coherent read). |
| Writes | XRDINVAL | Broadcast read and invalidate line with owner. |
| | XUPGRADE | Broadcast invalidate line - upgrade un-writable copy. |
| Memory Updates | XMWRITE | Broadcast memory write-back - victim write. |
| | XMUPDATE | Broadcast memory update - victim write. |
| | XWRITEC | Broadcast write coherent. |
| Special Commands | MACK | Broadcast migration acknowledgment. |
| | XINVAL | Broadcast invalidate. |

According to the cache coherency protocol described herein, source processors 12 and 14 issue data requests initially as broadcast snoop requests using the SSP commands set forth in Table 2. If the snoop requests fail and a transition to the FPP is required (e.g., due to a conflict), the system 10 can reissue the request using a forward progress technique. For example, the system 10 can transition to an FPP mode and the requests can be reissued using FPP commands.

Whenever a broadcast read or write snoop is issued by a source node (e.g., source processor 12) in the system 10, target nodes of the system (e.g., target processor 14, memory 16, and nodes 20) may issue an SSP response to the snoop. A list of example SSP responses that may be included in the cache coherency protocol described herein is depicted below in Table 3.

TABLE 3

| SSP Broadcast Response | Response Description |
|---|---|
| D-DATA | Ownership data response - Corresponding snoop command was the first to arrive at a cache ordering point (M, O, D, E, F state); the ordering point is being transferred to the requesting processor. At most, one D-DATA command can exist per cache line at any given time. |
| S-DATA | Shared data response - Data is being returned from a cache ordering point; the ordering point is not being transferred. |
| M-DATA | Memory data response - Data is being returned from home memory. |
| MISS | General snoop response: Snoop failed to match a cache or MAF entry at a snoop target. Snoop matched at a snoop target and invalidated a cache line at the target. Acknowledgement for broadcast invalidate line requests. Acknowledgement for broadcast migration acknowledgement requests. Acknowledgement for broadcast victim write requests. |
| SHARED | Snoop hit shared - Read snoop matched on a cache line in the S-state. |
| CONFLICT | Snoop conflict - Snoop matched a valid MAF (read or write) or T-state cache line at a target processor. |
| RD-CONF | Snoop read conflict - A special case conflict used where a snoop matched a valid read MAF. |
| FPP | Snoop hit FPP-Mode MAF - Some other processor is trying to access the same cache line and has already transitioned to the forward progress protocol (FPP) mode. This response is required for forward progress/starvation avoidance. |

When a source node (e.g., source processor 12) issues a source broadcast request for data, each of the target nodes (e.g., target processor 14, memory 16, and nodes 20) having a copy of the requested data may provide a data response. In the cache coherency protocol described herein, there are three different types of data responses: shared data responses (S-DATA), dirty data responses (D-DATA), and memory data responses (M-DATA). It is thus possible that, in response to a source broadcast request for data, the source processor 12 can receive several different data responses.

In general, D-DATA overrides both M-DATA and S-DATA, meaning that D-DATA will result in a cache fill, overwriting M-DATA or S-DATA. Additionally, S-DATA will overwrite M-DATA, but not D-DATA. Thus, D-DATA has priority over M-DATA and S-DATA, and S-DATA has priority over M-DATA. M-DATA results in a cache fill only if no other types of data have been received.

Examples of processor snoop responses to source broadcast snoop requests that can occur in the system 10 and the target node state transitions that result therefrom are provided in Table 4. The state transitions set forth in Table 4 assume that no conflicts are encountered in response to the respective commands. Conflict conditions can affect state transitions. As shown in Table 4, the response to the source node varies depending on the type of broadcast snoop request received at the target node and the cache state of the target node when the snoop request is received.

TABLE 4

| Source Node Request | Target Node Cache State | Target Node Next Cache State | Response to Source Node |
|---|---|---|---|
| XREAD | T | Unchanged | CONFLICT |
| XREAD | I | Unchanged | MISS |
| XREAD | S | Unchanged | Shared |
| XREAD | E, F | F | S-DATA |
| XREAD | D, O | O | S-DATA |
| XREAD | M | T | D-DATA |
| XRDINVAL | T | Unchanged | CONFLICT |
| XRDINVAL | S, I | I | MISS |
| XRDINVAL | M, D, O, E, F | T | D-DATA |

A target node can provide an ownership data response that includes D-DATA, for example, when the processor has an ownership state (e.g., M, O, E, F or D) associated with the cached data in the SSP protocol. It is the state of the cached data that defines the node (processor) as a cache ordering point for the data. When a processor responds with D-DATA, the ordering point is transferred to the requesting processor. S-DATA is a shared data response that indicates data is being returned from a cache ordering point, although the ordering point itself is not being transferred to the requester. An S-DATA response also indicates that a copy of the data may be in one or more other caches. An M-DATA response can be provided by memory (e.g., a home node) by returning the present value for the data stored in memory. It is possible that the M-DATA is stale and not up-to-date. Examples of state transitions that can occur during selected source broadcast transactions in the system 10 for selected processor commands are provided in Table 5.

TABLE 5

| | Current State | | | Next State | | |
|---|---|---|---|---|---|---|
| Command | Source | Owner | Sharer | Source | Owner | Sharer |
| Broadcast migratory read request XREAD | I | I | I | E | I | I |
| | I | I | S | F | I | S |
| | I | E | I | S | F | I |
| | I | F | I | S | F | I |
| | I | F | S | S | F | S |
| | I | D | I | S | O | I |
| | I | M | I | D | I | I |
| | I | O | I | S | O | I |
| | I | O | S | S | O | S |

TABLE 5-continued

| | Current State | | | Next State | | |
|---|---|---|---|---|---|---|
| Command | Source | Owner | Sharer | Source | Owner | Sharer |
| Broadcast read and invalidate line with owner XRDINVAL | I | I | I | E | I | I |
| | I | I | S | E | I | I |
| | I | E | I | E | I | I |
| | I | F | I | E | I | I |
| | I | F | S | E | I | I |
| | I | D | I | D | I | I |
| | I | M | I | D | I | I |
| | I | O | I | D | I | I |
| | I | O | S | D | I | I |

By way of further example, with reference to FIG. 1, assume that the processor 12 (a source node) requires a copy of data associated with a particular memory address, and assume that the data is unavailable from its own local cache 22. Since the processor 12 does not contain a copy of the requested data, the cache line of the processor may be initially in the I-state (invalid) for that data or it may contain different data altogether. For purposes of simplicity of explanation, the starting state of the source node cache line for this and other examples is the I-state. The processor 12, operating as the source node, transmits a source broadcast read snoop (XREAD) to the system 10, including the other processor 14, to the memory 16, and to the other nodes 20 via the system interconnect 18.

In this example, it is assumed that, at the time of the XREAD request, processor 14 is an owner node, i.e., a cache ordering point for the data. Assume also that the other nodes 20 are invalid for the data. For this example, assume that the processor 14 has a copy of the data in an M-state cache line of cache 24. Referring to Table 5, after the XREAD request transaction broadcast from the source processor 12 is complete, the source processor 12 will be in the D-state for the data, having received a D-DATA response from the owner processor 14 (see, e.g., Table 4). The processor 14 will be in the I-state for the data when the migratory data transaction is completed. The processor 12, serving as the cache ordering point for the data, thus becomes a point for serializing subsequent requests for the data and may transfer the ordering point to subsequent requesting processors without updating memory 16.

Figure 2:
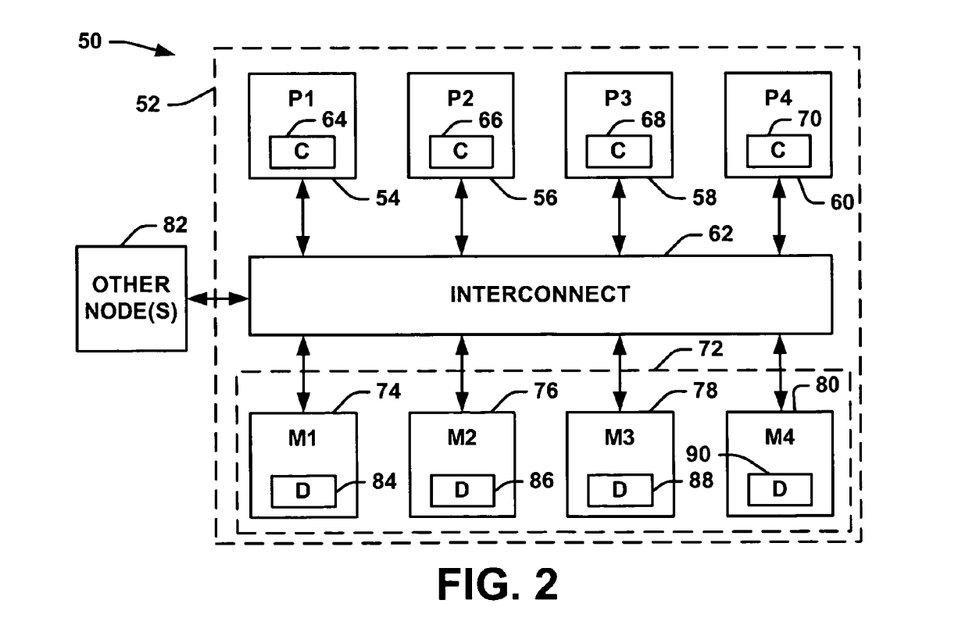
FIG. 2 depicts an example of another multi-processor system.

FIG. 2 depicts an example of a multi-processor computing system 50. The system 50, for example, includes an SMP (symmetric multi-processor) processor 52 that includes processors (P1, P2, P3, P4) 54, 56, 58 and 60 in communication with each other via an interconnect 62. The interconnect 62 facilitates transferring data between processors and memory of the system 50. While four processors 54, 56, 58, and 60 are depicted in the example of FIG. 2, those skilled in the art will appreciate that a greater or smaller number of processors can be implemented in the processor 52.

Each processor 54, 56, 58, and 60 also includes an associated cache 64, 66, 68 and 70. The caches 64, 66, 68, and 70 can enable faster access to data than from an associated main memory 72 of the processor 52. The system 50 implements a cache coherency protocol designed to guarantee coherency of data in the system. By way of example, the cache coherency protocol can be implemented to include a source broadcast protocol in which broadcast snoops or requests for data are transmitted directly from a source processor to all other processors and memory in the system 50. The source broadcast protocol can further be implemented in conjunction with another forward progress protocol, such as a null-directory or other directory-based protocol. The system 50 of FIG. 2, for example, employs the source broadcast protocol to process a request for data. If the request cannot be processed using the source broadcast protocol, such as where a conflict exists, the system 50 transfers to its forward progress protocol.

The memory 72 can include multiple memory modules (M1, M2, M3, M4) 74, 76, 78 and 80. For example, the memory 72 can be organized as a single address space that is shared by the processors 54, 56, 58 and 60 as well as other nodes 82 of the system 50. Each of the memory modules 74, 76, 78 and 80 can include a corresponding directory 84, 86, 88 and 90 that defines where the corresponding coherent copy of the data should reside in the system 50. Alternatively, the memory modules may contain no directories. A coherent copy of data, for example, may reside in a home node (e.g., associated with a given memory module) or, alternatively, in a cache of one of the processors 54, 56, 58 and 60.

The other node(s) 82 can include one or more other SMP nodes associated with the SMP processor 52 via the interconnect 62. For example, the interconnect 62 can be implemented as a switch fabric or hierarchical switch programmed and/or configured to manage transferring requests and responses between the processors 54, 56, 58, and 60 and the memory 70, as well as those to and from the other nodes 82.

When the processor 54 requires desired data, the processor 54 operates as a source and issues a source broadcast snoop (e.g., a broadcast read or broadcast write request) to the system 50, including all other processors 56, 58 and 60 as well as to memory 72, via the interconnect 62. The cache coherency protocol described herein is designed to ensure that a correct copy of the data is returned in response to the source broadcast snoop.

By way of further example, with reference to FIG. 2, assume that the processor 54 (a source processor) requires a copy of data associated with a particular memory address, and assume that the data is unavailable from its own local cache 64. Since the source processor 54 does not contain a copy of the requested data, the cache line of the source processor may be initially in the I-state (invalid) for that data or it may contain different data altogether. The source processor 54 transmits a source broadcast read snoop (XREAD) to the system 50, including the processors 56, 58, and 60, as well as to the memory 72 and the other nodes 82, via the system interconnect 62.

In this example, it is assumed that, at the time of the XREAD request, processor 56 is an owner processor, i.e., a cache ordering point for the data. Assume also that processors 58 and 60, and the other nodes 82 are invalid for the data. For this example, assume that the owner processor 56 has a copy of the data in an F-state cache line of cache 66. Referring to Table 5, after the XREAD request transaction broadcast from the source processor 54 is complete, the source processor 54 will be in the S-state for the data, having received an S-DATA response from the owner processor 56 (see, e.g., Table 4). In this example, the cache ordering point for the data remains at the owner processor 56. The source processor 54 receives a shared copy of the data without updating memory 72.

Figure 3:
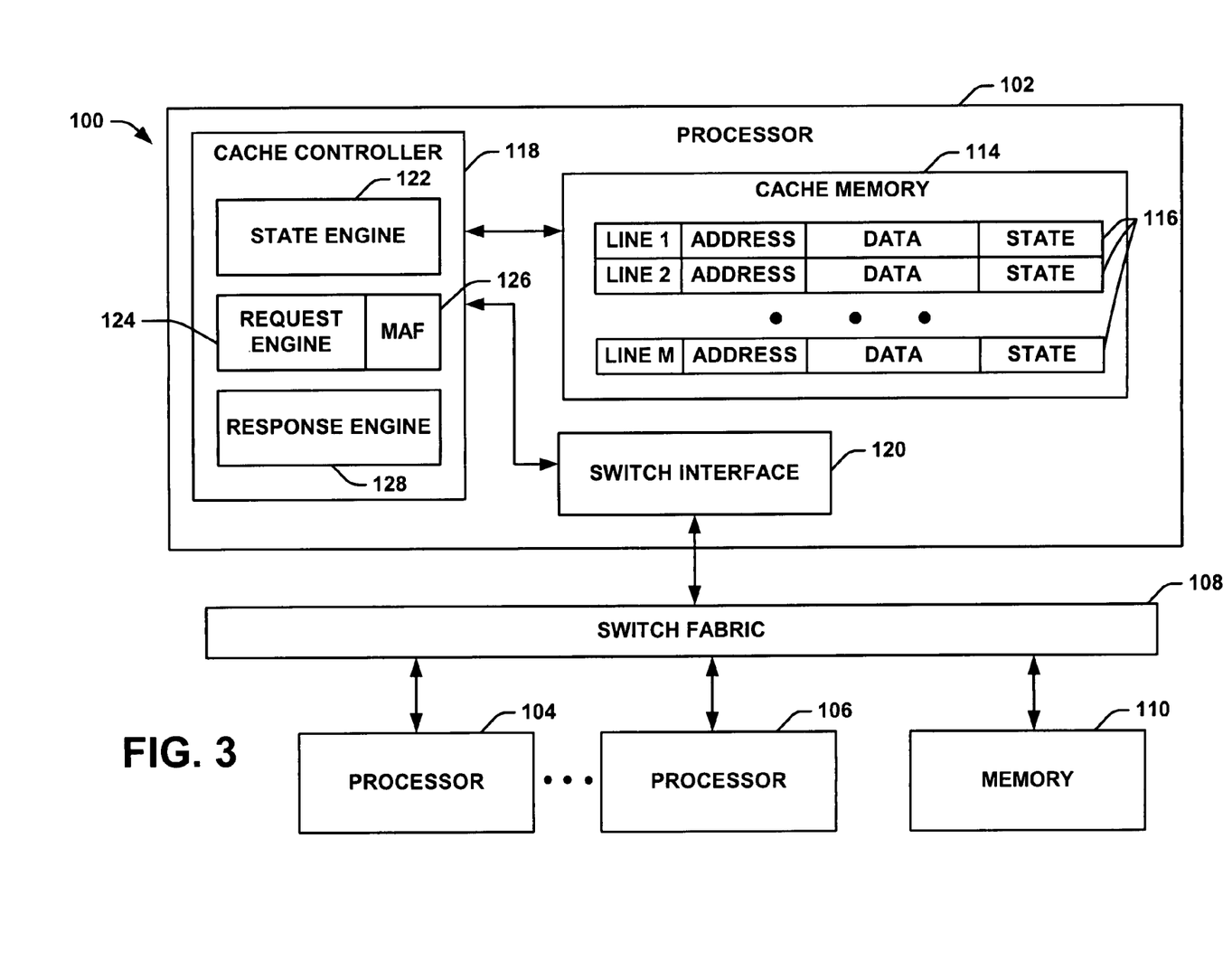
FIG. 3 depicts an example of a processor within a multi-processor system.

FIG. 3 depicts an example of another multi-processor system 100 that includes a plurality of processors 102, 104 and 106 in communication with each other via a switch fabric 108. The system 100 also includes associated memory 110, which can be organized as a single address space that is shared by the processors 102, 104, and 106. For example, the memory 110 can be implemented as a plurality of separate memory modules associated with each of the respective processors 102, 104, and 106 for storing data. The system 100, for example, can be implemented as an integrated circuit or as circuitry containing plural integrated circuits.

The system 100 can employ a source broadcast or source-snoopy cache coherency protocol. For this type of protocol, a source processor 102, 104, and 106 can issue a source broadcast request to all other processors in the system and to the memory 110. In the event that conflict arises, or the source broadcast request otherwise fails, the system 100 can transfer to a forward-progress protocol, such as a null-directory or other directory-based protocol.

In a null-directory-based protocol, for example, the memory 110 includes home nodes for each cache line. Instead of issuing a broadcast to all cache targets, the source issues a single request to the home node for such data. The home node thus operates as static ordering point for requested data since all requests are sent to the home node for ordering before snoops are broadcast. This tends to add an additional hop for the majority of references compared with a broadcast-based protocol described above. If the system employs a standard directory-based protocol, ordering is implemented, but the memory 110 employs associated directories that facilitate locating the data (e.g., based on the directory state associated with the requested data). In a standard directory protocol, there will be times when the directory can indicate that there are no cached copies, and thus the home node can respond with the data without issuing any snoops to the system 100.

The processor 102 includes cache memory 114 that contains a plurality of cache lines 116 (e.g., lines 1-M, where M is a positive integer, M≧1). Each cache line 116 can contain one or more memory blocks. A tag address (ADDRESS) is associated with the data contained in each cache line 116. Additionally, each cache line 116 can contain state information identifying the state of the data contained at that cache line. Examples of states that can be associated with each cache line 116 are identified above in Table 1.

A cache controller 118 is associated with the cache memory 114. The cache controller 118 controls and manages access to the cache memory, including requests for data and responses. The cache controller 118 communicates requests and responses via a switch interface 120 that is coupled with the switch fabric 108. The switch interface 120, for example, includes an arrangement of queues (e.g., input and output queues) or other data structures that organize both requests and responses issued by the processor 102 as well as requests and responses for execution by the processor.

In the example of FIG. 3, the cache controller 118 includes a state engine 122 that controls the state of each respective line 116 in the cache memory 114. The state engine 122 is programmed and/or configured to implement state transitions for the cache lines 116 based on predefined rules established by the cache coherency protocol described herein. For example, the state engine 122 can modify the state of a given cache line 116 based on requests issued by the processor 102. Additionally, the state engine 122 can modify the state of a given cache line 116 based on responses received at the processor 102 for the given tag address, such as may be provided by another processor 104, 106 and/or the memory 110.

The cache controller 118 also includes a request engine 124 that sends requests to the system 100. The request engine 124 employs a miss address file (MAF) 126 that contains MAF entries for outstanding requests associated with some subset of the locations in the cache memory 114. The MAF can be implemented as a table, an array, a linked list or other data structure programmed to manage and track requests for each cache line. For example, when the processor 102 requires data associated with a given address for a given line 116, the request engine 124 creates a corresponding entry in the MAF 126. The MAF entry includes fields that identify, for example, the address of the data being requested, the type of request, and response information received from other nodes in response to the request. The request engine 124 thus employs the MAF 126 to manage requests issued by the processor 102 as well as responses to such requests. The request engine can employ a data state machine and conflict state machine (see, e.g., FIGS. 2 and 3) associated with each MAF entry for helping to manage a data state and a conflict state associated with each MAF entry.

The cache controller 118 also includes a response engine 128 that controls responses provided by the processor 102. The processor 102 provides responses to requests or snoops received via the switch interface 120 from another processor 104 and 106 or memory 110. The response engine 128, upon receiving a request from the system 100, cooperates with the state engine 122 and the MAF 126 to provide a corresponding response based on the type of request and the state of data contained in the cache memory 114. For example, if a MAF entry exists for a tag address identified in a request received from another processor 104, 106 or memory 110, the cache controller 118 can implement appropriate conflict resolution defined by the coherency protocol. The response engine 128 thus enables the cache controller to send an appropriate response to requesters in the system 100. A response to a request can also cause the state engine 122 to effect a state transition for an associated cache line 116.

By way of example, assume that the processor 102 requires data not contained locally in its cache memory 114. The request engine 124 will create a MAF entry in the MAF 126, corresponding to the type of request and the tag address associated with data required. For a read request, for example, the processor 102 issues an XREAD request and allocates a corresponding entry in the MAF 126. In this example, it is assumed that, at the time of the XREAD request, processor 104 is an owner processor, i.e., a cache ordering point for the data. Assume also that processor 106 is invalid for the data. For this example, assume that the owner processor 104 has a copy of the data in a D-state cache line. Referring to Table 5, after the XREAD request transaction broadcast from the source processor 104 is complete, the source processor 104 will be in the S-state for the data, having received an S-DATA response from the owner processor 106 (see, e.g., Table 4). In this example, processor 106 transitions to the O-state (see, e.g., Table 5) and, thus, the cache ordering point for the data remains at the processor 106. The source processor 104 receives a shared copy of the data without updating memory 110.

Those skilled in the art will understand and appreciate that the protocol described herein can be implemented in multi-processor systems employing general system interconnects (e.g., as contrasted with a bus-based interconnect) where all processors and memory are on the same bus. In prior bus-based systems, all observers of broadcasts from different sources in the system perceive the broadcasts in the same order that the broadcasts occurred on the bus, as the bus itself operates as an ordering point. In contrast, the protocol described herein can be implemented over a general system interconnect (e.g., an unordered network interconnect) in which each observer of the broadcasts from plural different sources can perceive the order of the broadcasts differently.

In view of the foregoing structural and functional features described above, certain methods that can be implemented using a coherency protocol will be better appreciated with reference to FIGS. 4-9. FIGS. 4-8 depict various example timing diagrams for transaction scenarios that can arise in a multi-processor system employing a cache coherency protocol as described herein. Each of the examples illustrates various interrelationships between requests and responses and state transitions that can occur for a given memory tag address in different memory devices or caches. In each of these examples, time flows in the direction of an arrow labeled "TIME." Those skilled in the art may appreciate that there can be various other scenarios or transactions that can be implemented in a multi-processor system employing a cache coherency protocol as described herein.

Figure 4:
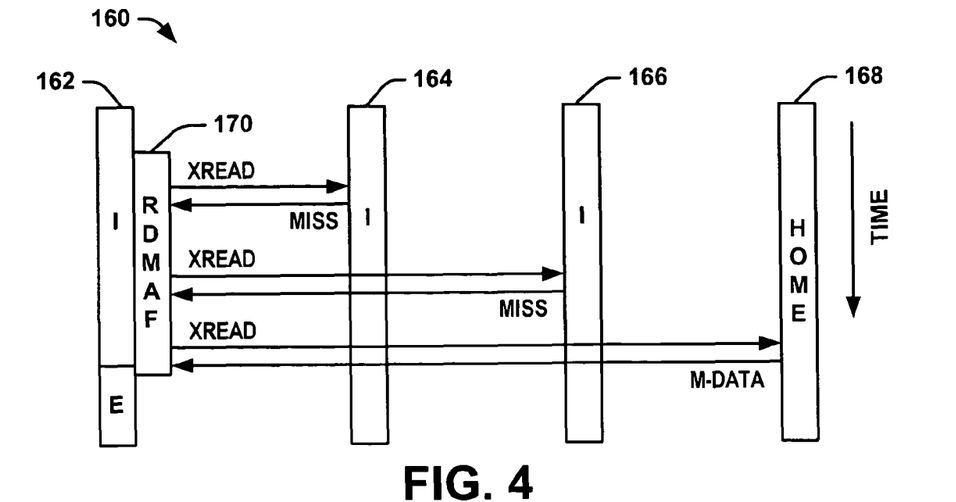
FIG. 4 depicts a timing diagram for a first example scenario illustrating state transitions for a coherency protocol.

FIG. 4 illustrates a network 160 that includes processor nodes 162, 164, and 166 and a home node 168. Initially, nodes 162, 164, and 166 are in an I-state for a particular cache line. Node 168 contains a memory copy of the data associated with the cache line. In this example case, node 162 allocates a RDMAF entry 170 for the requested data and broadcasts an XREAD request to nodes 164 and 166, which, being in the I-state, each return a MISS response (see, e.g., Table 4). Next, node 162 receives an M-DATA response to an XREAD request broadcast from node 162 to home node 168. Node 162 transitions to the E-state upon receiving the M-DATA response from node 168 because, at this point, MISS responses have been received from all of the nodes to which node 162 broadcast the XREAD snoop request. Thus, in the example of FIG. 4, node 162 receives the data from memory because there are no other cache ordering points from which to receive the data. Node 162, being in the E-state for the data, has an exclusive copy of the data and is a cache ordering point for the data. Node 162 may respond to subsequent requests for the data in accordance with the cache coherency protocol as described herein.

Figure 5:
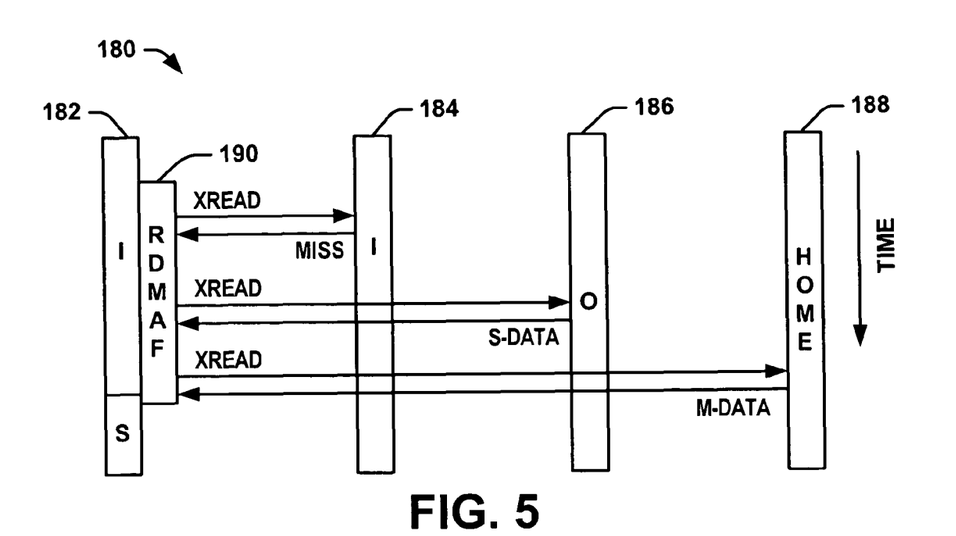
FIG. 5 depicts a timing diagram for a second example scenario illustrating state transitions for a coherency protocol.

FIG. 5 illustrates a network 180 that includes processor nodes 182, 184, and 186 and a home node 188. Initially, nodes 182 and 184 are in an I-state for a particular cache line. Home node 186 is in the O-state for the cache line and thus is a cache ordering point for the data. Node 188 contains a memory copy of the data associated with the cache line. In this example case, node 182 allocates a RDMAF entry 190 for the requested data and broadcasts an XREAD request to nodes 184, which, being in the I-state, each return a MISS response (see, e.g., Table 4). Next, node 182 receives an S-DATA response to an XREAD request broadcast from node 182 to node 186 because node 186 is a cache ordering point for the data. Node 186 remains in the O-state for the data. Next, node 182 receives an M-DATA response to an XREAD request broadcast from node 182 to home node 188.

At this point, responses have been received from all of the nodes to which node 182 broadcast the XREAD snoop request. Node 182, having received M-DATA and S-DATA, fills the cache at node 182 with the S-DATA because, according to the cache coherency protocol, S-DATA overrides M-DATA. Node 182 transitions to the S-state and becomes a sharer node for the data. Thus, in the example of FIG. 5, node 182 receives the data from node 186 because node 186 is a cache ordering point for the data. Node 186 remains the cache ordering point for the data and thus may respond to subsequent requests for the data in accordance with the cache coherency protocol as described herein.

Figure 6:
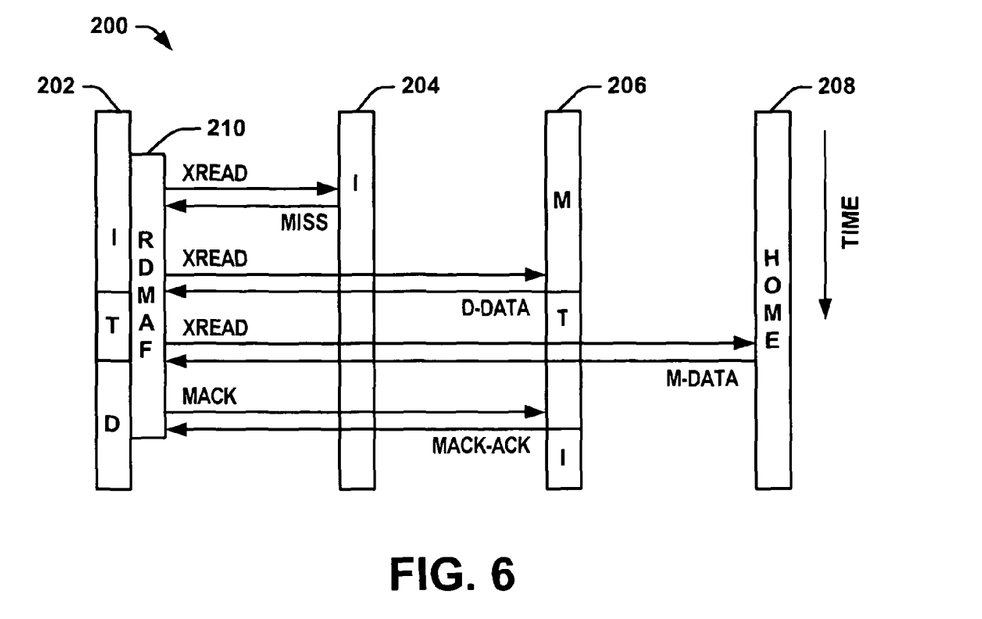
FIG. 6 depicts a timing diagram for a third example scenario illustrating state transitions for a coherency protocol.

FIG. 6 illustrates a network 200 that includes processor nodes 202, 204, and 206 and a home node 208. Initially, nodes 202 and 204 are in an I-state for a particular cache line. Node 206 is in the M-state for the cache line and thus is a cache ordering point for the data. Home node 208 contains a memory copy of the data associated with the cache line. In this example case, node 202 allocates a RDMAF entry 210 for the requested data and broadcasts an XREAD request to node 204, which, being in the I-state, returns a MISS response. Next, node 202 receives a D-DATA response to an XREAD request broadcast from node 202 to node 206 because node 206 is a cache ordering point for the data (see, e.g., Table 4). Node 206 transitions to the T-state for the data. Next, node 202 receives an M-DATA response to an XREAD request broadcast from node 202 to home node 208.

At this point, responses have been received from all of the nodes to which node 202 broadcast the XREAD snoop request. Node 202, having received M-DATA and D-DATA, fills the cache at node 202 with the D-DATA because, according to the cache coherency protocol, D-DATA overrides M-DATA. In this instance, the ordering point for the modified data at node 206 migrates to node 202 without updating memory at home node 208. Node 202 transitions to the D-state and initiates a MACK/MACK-ACK sequence with node 206 to complete the migratory read transaction. Thus, in the example of FIG. 6, node 202 receives the migratory data from node 206 and becomes the cache ordering point for the data. Node 202 thus may respond to subsequent requests for the data in accordance with the cache coherency protocol as described herein.

Figure 7:
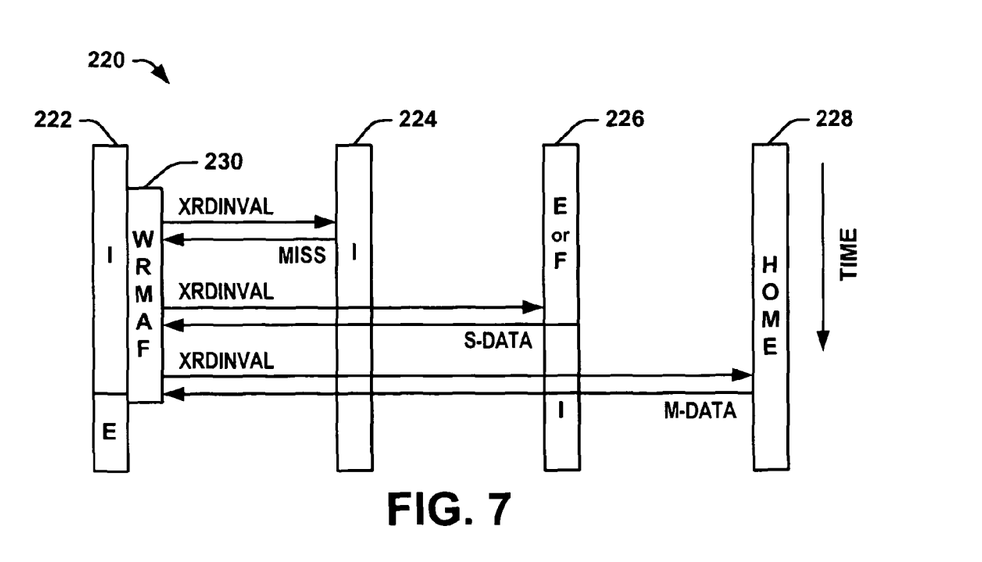
FIG. 7 depicts a timing diagram for a fourth example scenario illustrating state transitions for a coherency protocol.

FIG. 7 illustrates a network 220 that includes processor nodes 222, 224, and 226 and a home node 228. Initially, nodes 222 and 224 are in an I-state for a particular cache line. Node 226 is in one of the E and F states for the cache line and thus is a cache ordering point for the data. Node 228 contains a memory copy of the data associated with the cache line. In this example case, node 222 allocates a write MAF (WR-MAF) entry 230 for the requested data and broadcasts an XRDINVAL request to node 224, which, being in the I-state, returns a MISS response (see, e.g., Table 4). Next, node 222 receives an S-DATA response to an XRDINVAL request broadcast from node 222 to node 226 because node 226 is a cache ordering point for the data. Node 226 transitions to the I-state for the data due to the invalidate line functionality of the XRDINVAL command. Next, node 222 receives an M-DATA response to an XRDINVAL request broadcast from node 222 to home node 228.

At this point, responses have been received from all of the nodes to which node 222 broadcast the XRDINVAL snoop request. Node 222, having received M-DATA and S-DATA, fills the cache at node 222 with the S-DATA because, according to the cache coherency protocol, S-DATA overrides M-DATA. Node 222 transitions to the E-state for the data and thus has an exclusive copy of the data. Thus, in the example of FIG. 7, node 222 becomes the cache ordering point for the data. Node 222 thus may respond to subsequent requests for the data in accordance with the cache coherency protocol as described herein.

Figure 8:
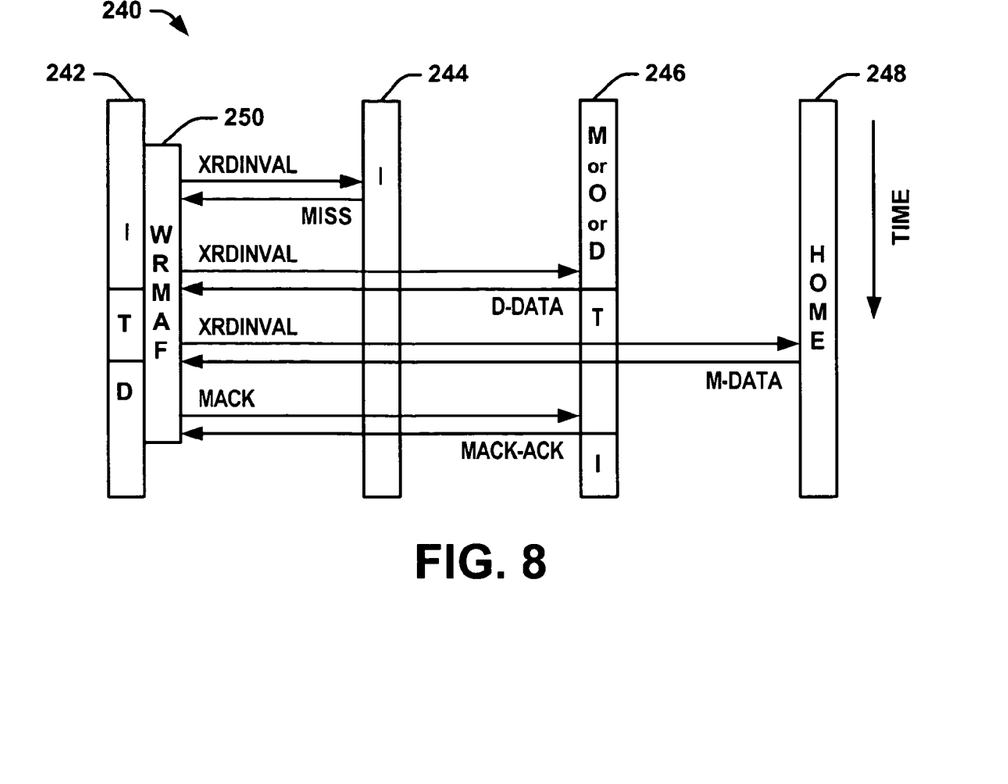
FIG. 8 depicts a timing diagram for a fifth example scenario illustrating state transitions for a coherency protocol.

FIG. 8 illustrates a network 240 that includes processor nodes 242, 244, and 246 and a home node 248. Initially, nodes 242 and 244 are in an I-state for a particular cache line. Node 246 is in one of the M, O, and D states for the cache line and thus is a cache ordering point for the data. Node 248 contains a memory copy of the data associated with the cache line. In this example case, node 242 allocates a WRMAF entry 250 for the requested data and broadcasts an XRDINVAL request to node 244, which, being in the I-state, returns a MISS response. Next, node 242 receives a D-DATA response to an XRDINVAL request broadcast from node 242 to node 246 because node 246 is a cache ordering point for the data (see, e.g., Table 4). Node 246 transitions to the T-state for the data. Next, node 242 receives an M-DATA response to an XRDIN-VAL request broadcast from node 242 to home node 248.

At this point, responses have been received from all of the nodes to which node 242 broadcast the XRDINVAL snoop request. Node 242, having received M-DATA and D-DATA, fills the cache at node 242 with the D-DATA because, according to the cache coherency protocol, D-DATA overrides M-DATA. In this instance, the ordering point for the modified data at node 246 migrates to node 242 without updating memory at home node 248. Node 242 transitions to the D-state and initiates a MACK/MACK-ACK sequence with node 246 to complete the migration transaction. Thus, in the example of FIG. 8, node 242 receives the migratory data from node 246 and becomes the cache ordering point for the data. Node 242 thus may respond to subsequent requests for the data in accordance with the cache coherency protocol as described herein.

Figure 9:
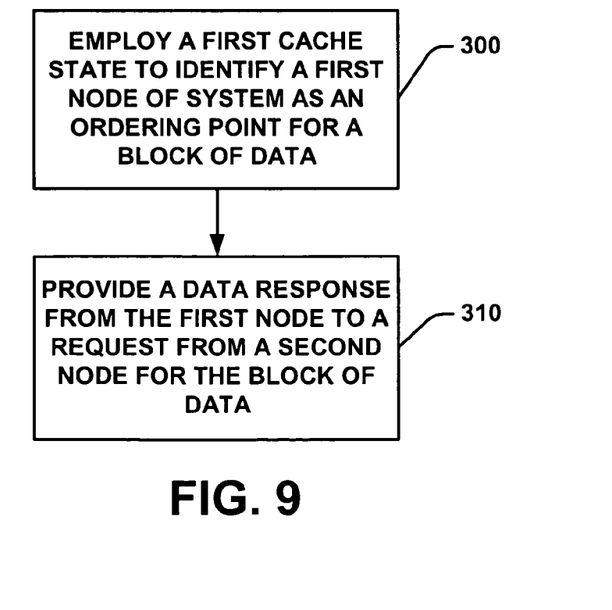
FIG. 9 depicts a flow diagram illustrating a method.

FIG. 9 depicts a method that includes employing a first cache state to identify a first node of a system as being an ordering point for a block of data, as indicated at 300. The method also includes providing a data response from the first node to a request from a second node of the system for the block of data, as indicated at 310.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A system comprising:
   a first node having an associated cache including data having an associated first cache state, the first cache state being capable of identifying the first node as being an ordering point for serializing requests from other nodes for the data;
   wherein the first cache state enables the first node to provide a data response to a request for the data from a second node for the data without updating a system memory, the data response comprising a copy of the data requested from the second node.

2. The system of claim 1, wherein the first cache state enables the first node to provide an ownership data response to the request for the data from a second node, the ownership data response transferring the ordering point from the first node to the second node.

3. The system of claim 2, wherein the first node defines a first processor and the second node defines a second processor, each of the first processor and the second processor having an associated cache, the associated caches of the first and second processors each comprising a plurality of cache lines, each cache line having a respective tag address that identifies associated data and each cache line having state information that indicates a state of the associated data for the respective cache line, the first and second processors being capable of communicating with each other and with other nodes of the system through an interconnect.

4. The system of claim 3, further comprising a first cache controller associated with the first processor and a second cache controller associated with the second processor, the first cache controller being operative to manage data requests and responses for the associated cache of the first processor, the first cache controller effecting state transitions associated with the data in the associated cache of the first processor based on the data requests and responses for the associated cache of the first processor, the second cache controller being operative to manage data requests and responses for the associated cache of the second processor, the second cache controller effecting state transitions associated with the data in the associated cache of the second processor based on the data requests and responses for the associated cache of the second processor.

5. A system comprising:
   a first node having an associated cache including data having an associated first cache state, the first cache state being capable of identifying the first node as being an ordering point for serializing requests from other nodes for the data;
   wherein the first cache state enables the first node to provide an ownership data response to a request for the data from a second node, the ownership data response transferring the ordering point from the first node to the second node the ownership data response comprising a copy of the data requested from the second node;
   wherein the first node provides the ownership data response without updating a system memory.

6. A system comprising:
   a first node having an associated cache including data having an associated first cache state, the first cache state being capable of identifying the first node as being an ordering point for serializing requests from other nodes for the data;
   wherein the first cache state enables the first node to provide an ownership data response to a request for the data from a second node, the ownership data response transferring the ordering point from the first node to the second node the ownership data response comprising a copy of the data requested from the second node;
   wherein the first node defines a first processor and the second node defines a second processor, each of the first processor and the second processor having an associated cache, the associated caches of the first and second processors each comprising a plurality of cache lines, each cache line having a respective tag address that identifies associated data and each cache line having state information that indicates a state of the associated data for the respective cache line, the first and second processors being capable of communicating with each other and with other nodes of the system through an interconnect;
   wherein the system implements a hybrid cache coherency protocol wherein each of the first and second processors employs a source broadcast-based protocol to issue a request for the data and employs an associated forward progress protocol to reissue a request for the data if the request fails in the source broadcast protocol.

7. The system of claim 6, wherein the forward progress protocol comprises a null-directory protocol.

8. The system of claim 6, wherein the source broadcast protocol comprises an incomplete protocol.

9. A system comprising:
   a first node having an associated cache including data having an associated first cache state, the first cache state being capable of identifying the first node as being an ordering point for serializing requests from other nodes for the data;
   wherein the first node comprises a cache including a plurality of cache lines, the system being capable of assigning a cache state to each of the cache lines to identify the status of data cached in the cache line, the cache state being selected from the group consisting of:
   a cache state indicating that the data is not cached in the cache line;
   a cache state indicating that the data cached in the cache line is valid and unmodified, that other nodes may have valid cached copies of the data, and that the node associated with the cache line cannot respond to snoops by returning a copy of the data;

a cache state indicating that the data cached in the cache line is valid and unmodified, that the data cached in that cache line is the only cached copy of the data in the system, and that the node associated with the cache line can respond to snoops by returning a copy of the data;

a cache state indicating that the data cached in the cache line is valid and unmodified, that other nodes may have valid copies of the data, and that the node associated with the cache line can respond to snoops by returning a copy of the data;

a cache state indicating that the data cached in the cache line is valid and more up-to-date than a copy of the data stored in a system memory, that the data cached in the cache line has not been modified by the node associated with the cache line, that the data cached in the cache line is the only cached copy of the data in the system, that the node associated with the cache line can respond to snoops by returning a copy of the data, and that the node associated with the cache line writes the data back to memory upon displacement;

a cache state indicating that the data cached in the cache line is valid and has been modified, that the data cached in the cache line is the only cached copy of the data in the system, that the node associated with the cache line can respond to snoops by returning the data, and that the node associated with the cache line writes the data back to memory upon displacement;

a cache state indicating that the data cached in the cache line is valid and more up-to-date than the copy of the data stored in system memory, that the node associated with the cache line cannot modify the data cached in the cache line, that other nodes may have valid copies of the data in the cache line, that the node associated with the cache line can respond to snoops by returning the data, and that the node associated with the cache line writes the data back to memory upon displacement; and a cache state indicating that the cache line is transitioning between cache states.

10. A multi-processor network comprising:

a plurality of processor nodes, each processor node having at least one associated cache;

the plurality of processor nodes employing a coherency protocol, the coherency protocol employing ordering points for serializing requests for data associated with the at least one associated cache of the plurality of processor nodes, the ordering point for the data being identified by a cache state that is associated with the at least one associated cache of one of the processor nodes;

the multi-processor network being capable of assigning a cache state to each associated cache of each processor node to identify the status of a block of data in the associated cache, the cache state being selected from the group consisting of:

a cache state indicating that the block of data does not exist in the associated cache;

a cache state indicating that the block of data in the associated cache is valid and unmodified, that other processor nodes may have valid copies of the block of data, and that the processor node associated with the associated cache cannot respond to snoops by returning a copy of the block of data;

a cache state indicating that the block of data in the associated cache is valid and unmodified, that the block of data in the associated cache is the only cached copy of the block of data in the multi-processor network, and that the processor node associated with the associated cache can respond to snoops by returning a copy of the block of data;

a cache state indicating that the block of data in the associated cache is valid and unmodified, that other nodes may have valid copies of the block of data, and that the processor node associated with the associated cache can respond to snoops by returning a copy of the block of data;

a cache state indicating that the block of data in the associated cache is valid and more up-to-date than a copy of the block of data stored in a system memory, that the block of data in the associated cache has not been modified, that the block of data in the associated cache is the only cached copy of the block of data in the system, and that the processor node associated with the associated cache can respond to snoops by returning a copy of the block of data and writes the block of data back to memory upon displacement;

a cache state indicating that the block of data in the associated cache is valid and has been modified, that the block of data in the associated cache is the only cached copy of the block of data in the system, and that the processor node associated with the associated cache can respond to snoops by returning a cop of the block of data and writes the block of data back to memory upon displacement;

a cache state indicating that the block of data in the associated cache is valid and more up-to-date than the copy of the block of data stored in system memory, that the processor node associated with the associated cache cannot modify the block of data, that other processor nodes may have valid copies of the block of data, and that the processor node associated with the associated cache can respond to snoops b returning a copy of the block of data and writes the block of data back to memory upon displacement; and a cache state indicating that the associated cache is transitioning between cache states.

11. The multi-processor network of claim 10, wherein the coherency protocol employs a first cache state at a first node of the plurality of processor nodes to identify the first node as an ordering point for the data, the first cache state enabling the first node to provide a data response to a request from a second node for the data without updating a system memory.

12. The multi-processor network of claim 10, wherein an ownership data response transfers the ordering point from the first node to the second node.

13. A method comprising:

employing a first cache state to identify a first node of a system as being an ordering point for a block of data; and providing a data response from the first node to a request from a second node of the system for the block of data;

wherein providing a data response comprises:

employing a source broadcast protocol to deterministically resolve the request from the second node for the block of data; and employing a forward progress technique to deterministically resolve the request from the second node for the block of data if the request from the second node cannot be deterministically resolved through employing the source broadcast protocol.

14. The method of claim 13, further comprising enabling the ordering point to provide the data response without updating a system memory.

15. The method of claim 13, wherein providing a data response comprises:

providing an ownership data response; and transferring the ordering point from the first node to the second node.

16. The method of claim 13, wherein employing a forward progress technique comprises employing a forward progress protocol.

* * * * *

UNITED STATES PATENT AND TRADEMARK OFFICE
CERTIFICATE OF CORRECTION

PATENT NO.       : 8,145,847 B2
APPLICATION NO.  : 10/760640
DATED            : March 27, 2012
INVENTOR(S)      : Stephen R. Van Doren et al.

It is certified that error appears in the above-identified patent and that said Letters Patent is hereby corrected as shown below:

In column 18, line 20, in Claim 10, delete "cop" and insert -- copy --, therefor.

In column 18, line 30, in Claim 10, delete "b" and insert -- by --, therefor.

Signed and Sealed this
Thirteenth Day of November, 2012

David J. Kappos
*Director of the United States Patent and Trademark Office*